US005649149A

United States Patent [19]
Stormon et al.

[11] Patent Number: 5,649,149
[45] Date of Patent: Jul. 15, 1997

[54] INTEGRATED CONTENT ADDRESSABLE MEMORY ARRAY WITH PROCESSING LOGICAL AND A HOST COMPUTER INTERFACE

[75] Inventors: Charles D. Stormon, Syracuse, N.Y.; Abhijeet Chavan, Ann Arbor, Mich.; Nikos B. Troullinos, Syracuse, N.Y.; Raymond M. Leong, Los Altos, Calif.

[73] Assignee: Cypress Semiconductor Corporation, San Jose, Calif.

[21] Appl. No.: 284,347

[22] Filed: Aug. 1, 1994
(Under 37 CFR 1.47)

[51] Int. Cl.⁶ .............................. G06F 12/02; G06F 13/00
[52] U.S. Cl. ...................... 395/435; 364/DIG. 1; 364/DIG. 2; 364/247; 365/49; 365/50
[58] Field of Search ........................ 395/375, 431, 395/432, 435; 365/49; 364/DIG. 1, DIG. 2, 247

[56] References Cited

U.S. PATENT DOCUMENTS

| | | | |
|---|---|---|---|
| 4,888,731 | 12/1989 | Chuang et al. | 365/49 |
| 4,890,260 | 12/1989 | Chuang et al. | 365/49 |
| 4,928,260 | 5/1990 | Chuang et al. | 365/49 |
| 4,959,811 | 9/1990 | Szczepanek | 365/49 |
| 5,329,405 | 7/1994 | Hou et al. | 395/800 |
| 5,359,720 | 10/1994 | Tamura | 395/435 |
| 5,363,499 | 11/1994 | Glass | 395/435 |
| 5,383,146 | 1/1995 | Threewith | 365/49 |
| 5,394,524 | 2/1995 | DiNicola et al. | 395/163 |
| 5,414,704 | 5/1995 | Spinney | 395/400 |
| 5,428,759 | 6/1995 | Smith et al. | 395/400 |
| 5,428,773 | 6/1995 | Berkovich | 395/600 |
| 5,440,709 | 8/1995 | Edgar | 395/401 |
| 5,440,753 | 8/1995 | Hou et al. | 395/800 |

OTHER PUBLICATIONS

*Associative Processing Products*, Coherent Research, Inc., (entire document–28 pages).

Primary Examiner—Tod R. Swann
Assistant Examiner—Tuan V. Thai
Attorney, Agent, or Firm—Blakely, Sokoloff, Taylor & Zafman

[57] ABSTRACT

An associative processing memory system for concurrent data searching or processing includes a content addressable memory (CAM) array, a general register block, an interface register logic block, and a general control block. The CAM array is accessed for read or write by a select vector generated by the general register logic block. The select vector is selected through a multiplexer from at least four sources: the match latch, the multiple response resolver, the general purpose logic block and a supplies one unit. The interface register logic block provides input/output data registers, mask register, command register, and control/status register. The general control block generates control signals to the CAM system in response to bus signals. The match operation for the CAM array can be performed on all words in a single operation. A set of CAM instructions is used to control CAM operations including data movement, shifting, read/write, and match.

20 Claims, 14 Drawing Sheets

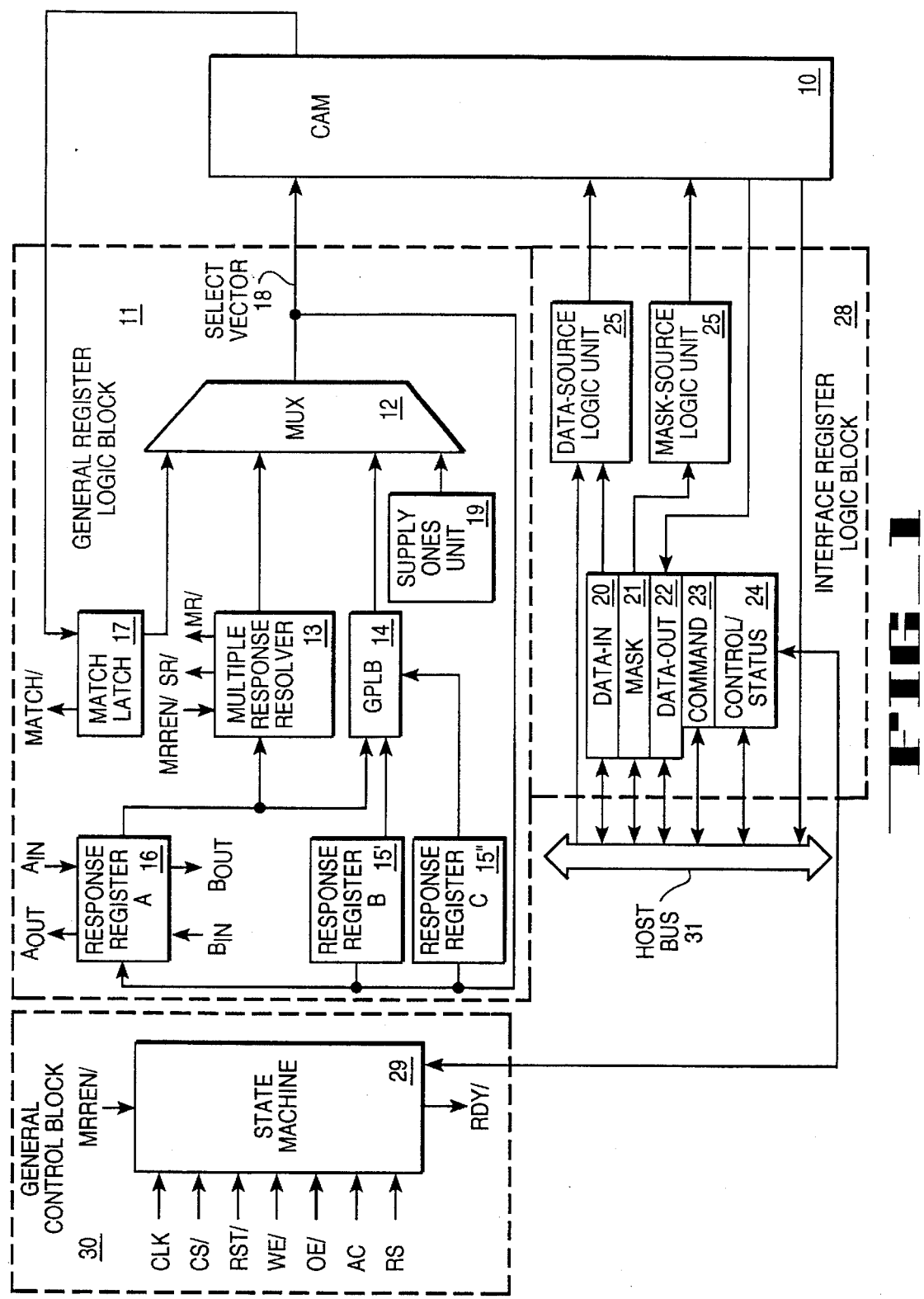
FIG_1

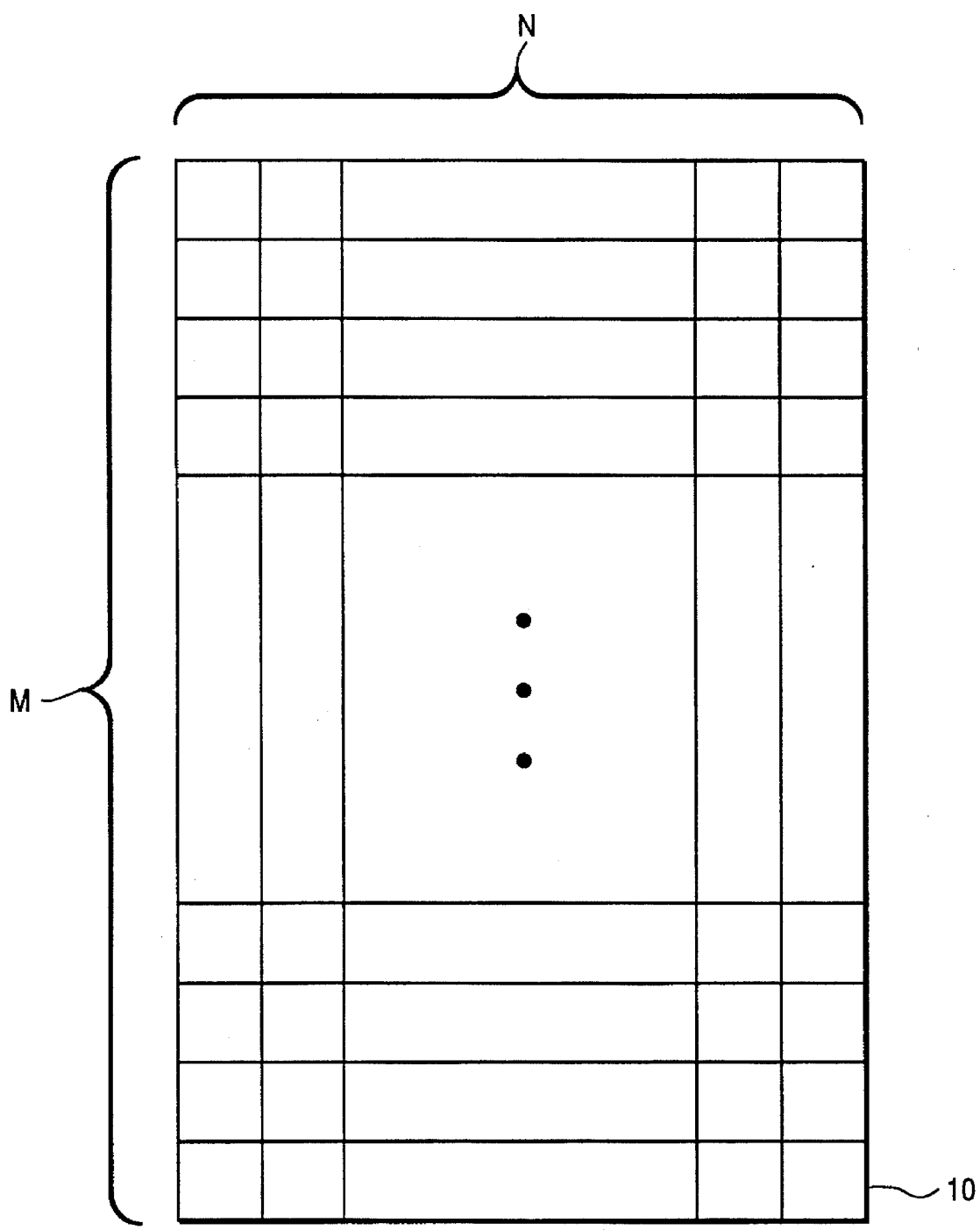
FIG_2

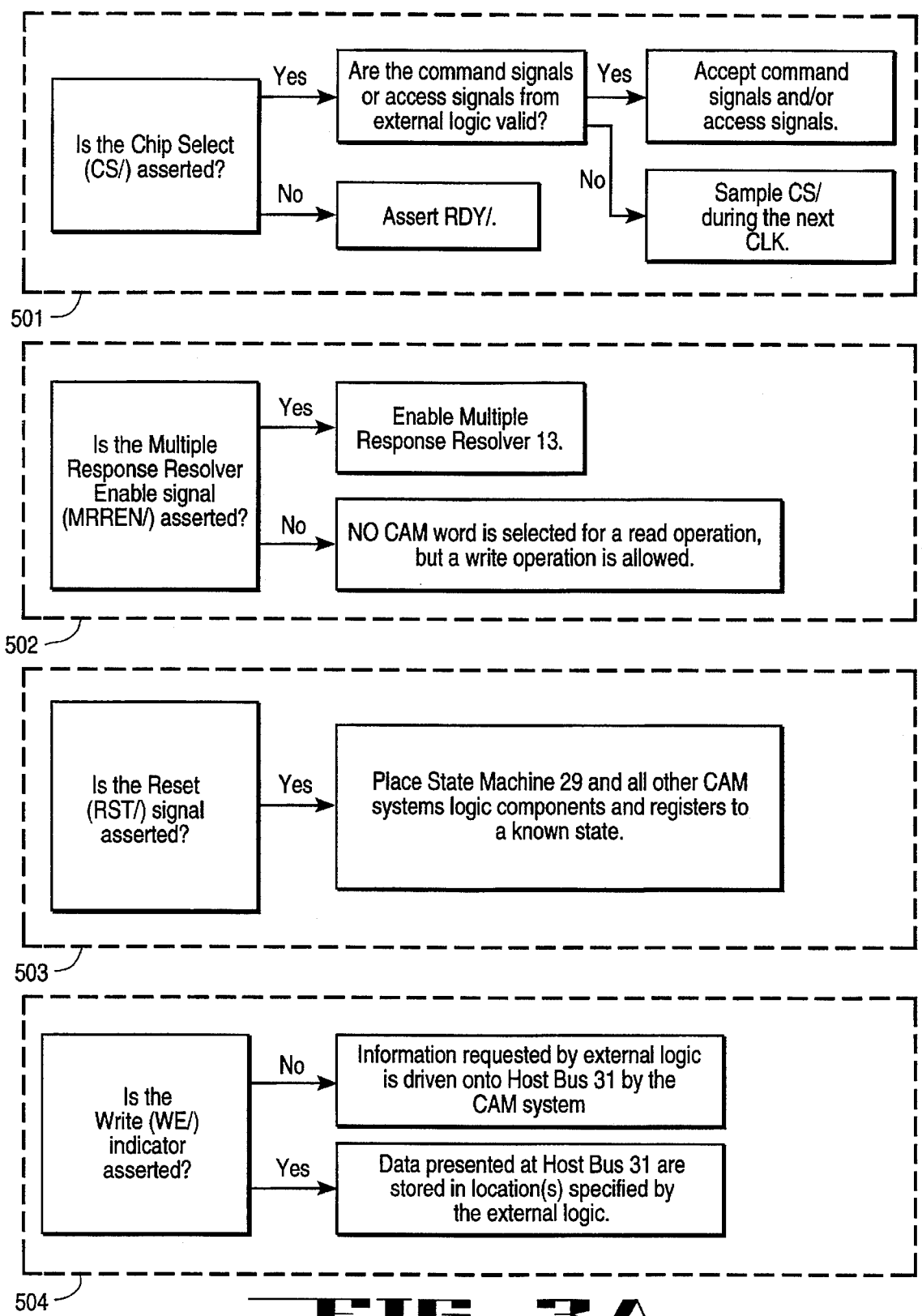
FIG_3A

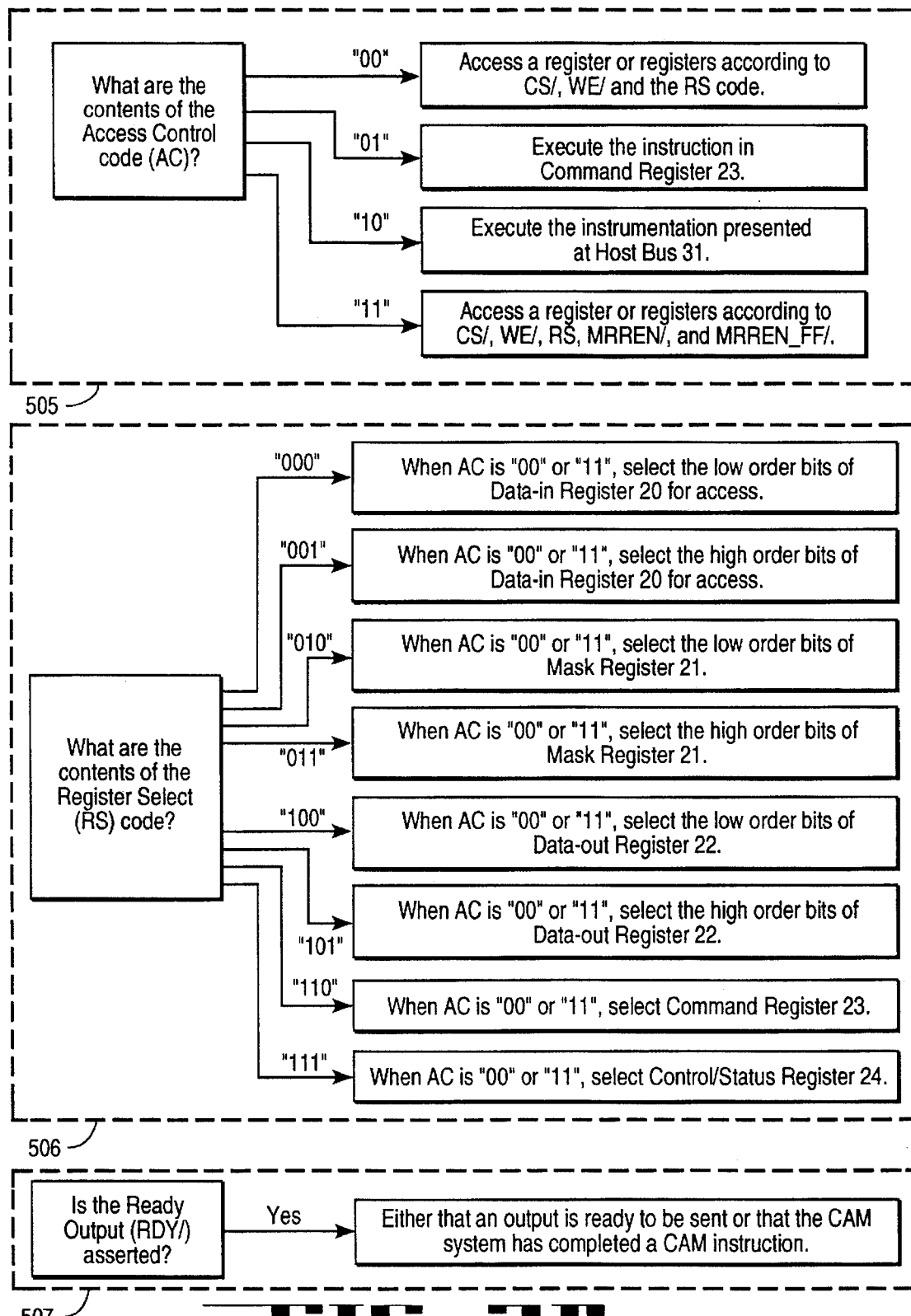
FIG_3B

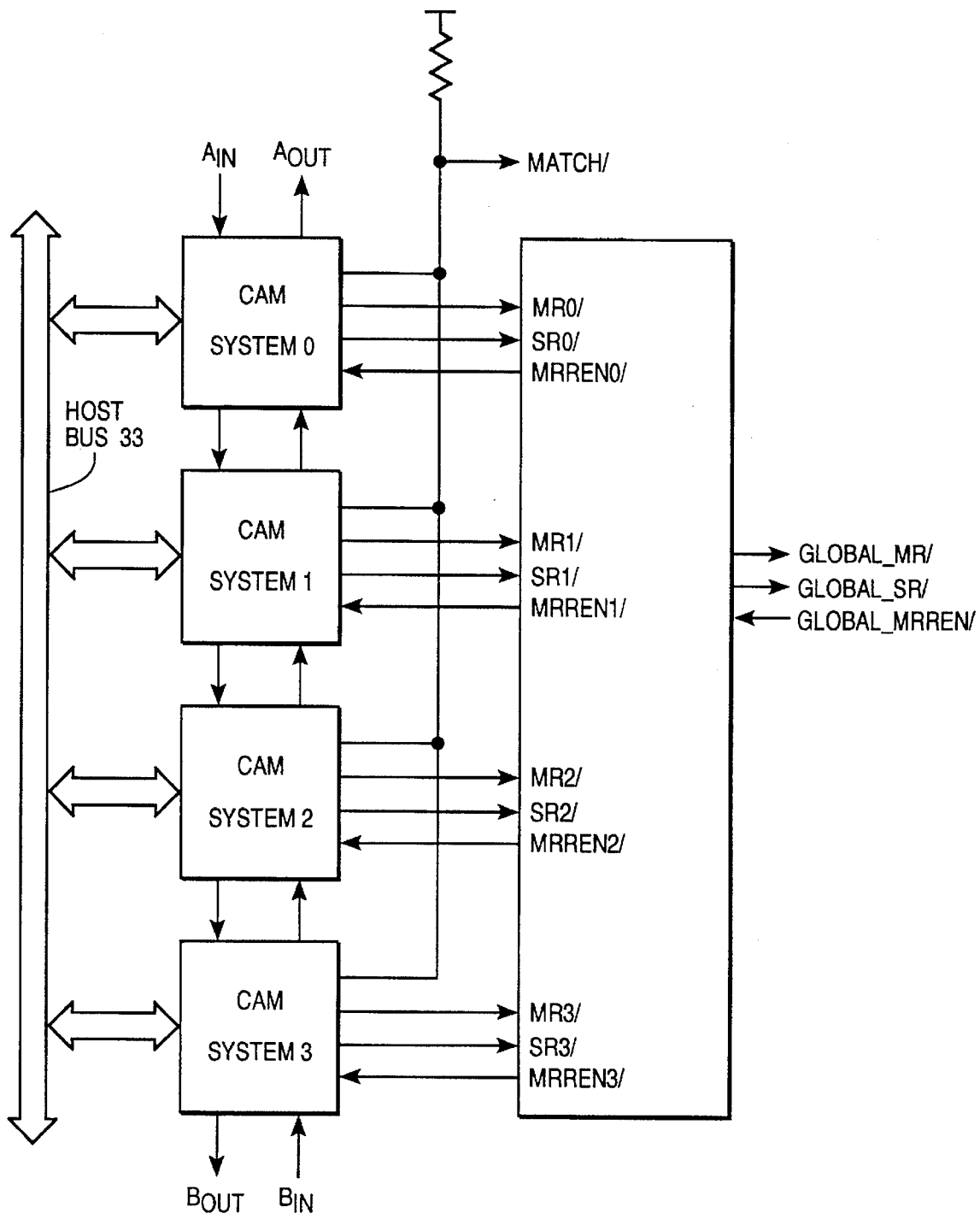
FIG_4A

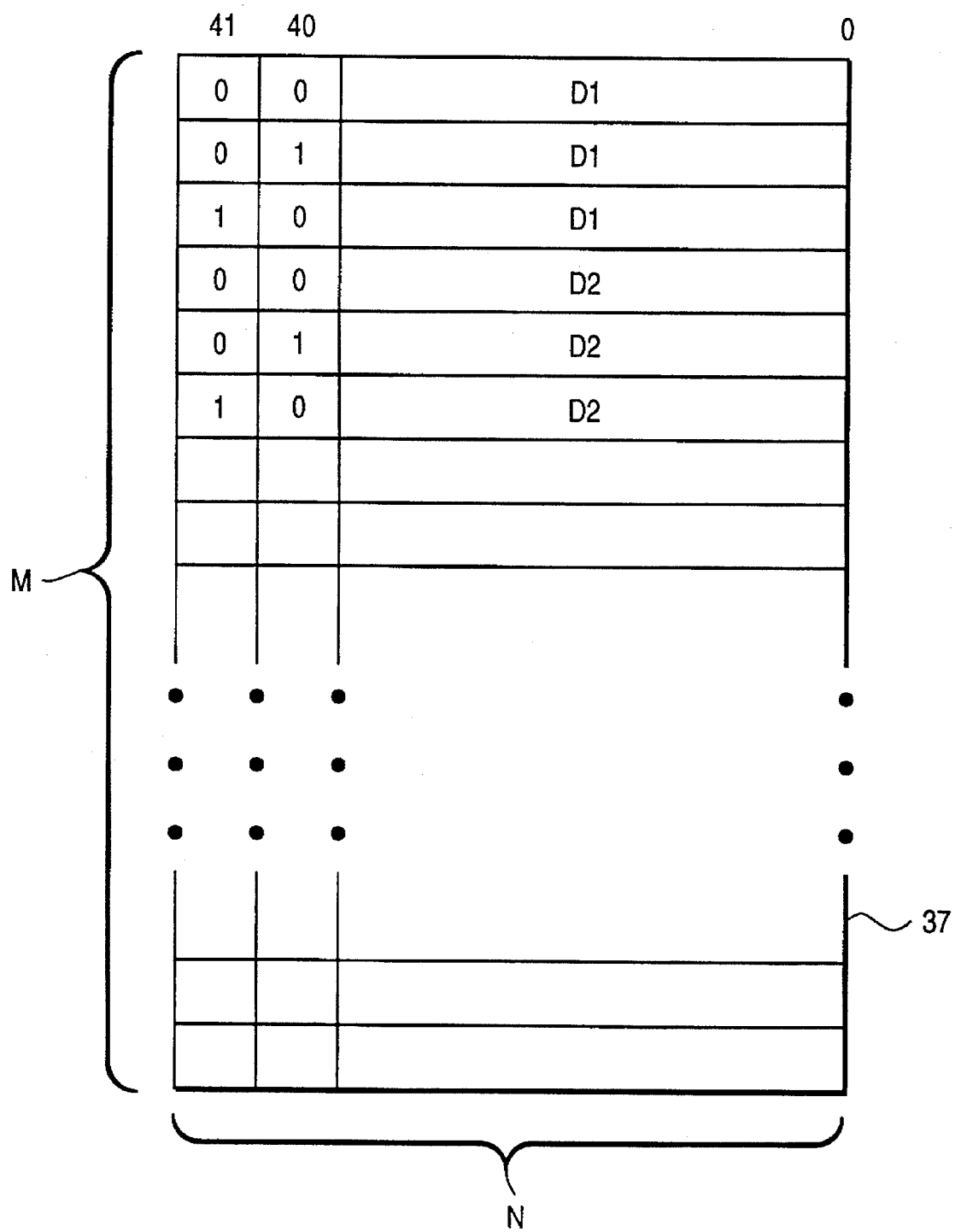
FIG_4B

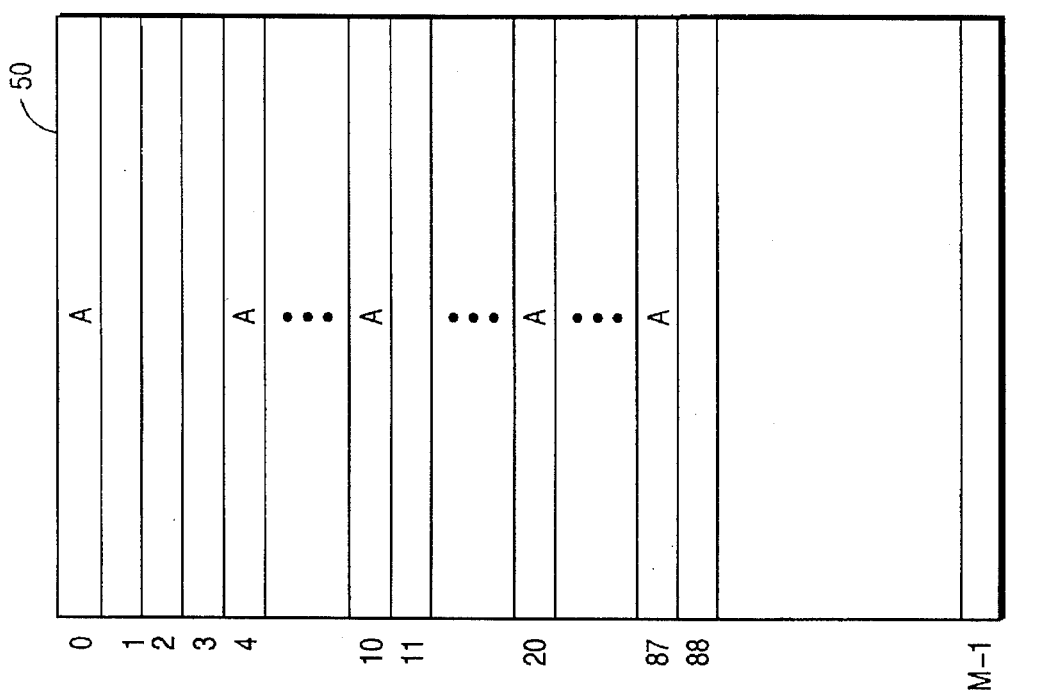
FIG_6B
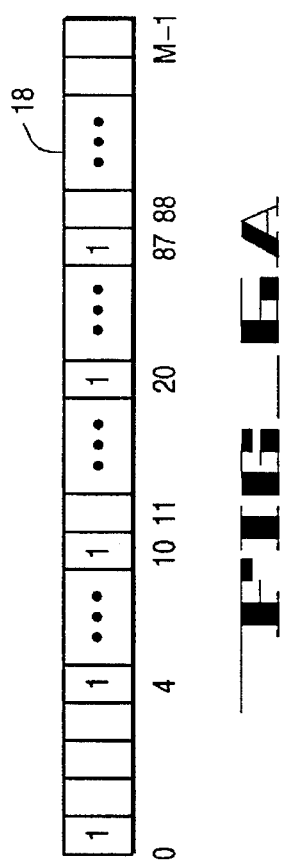
FIG_6A

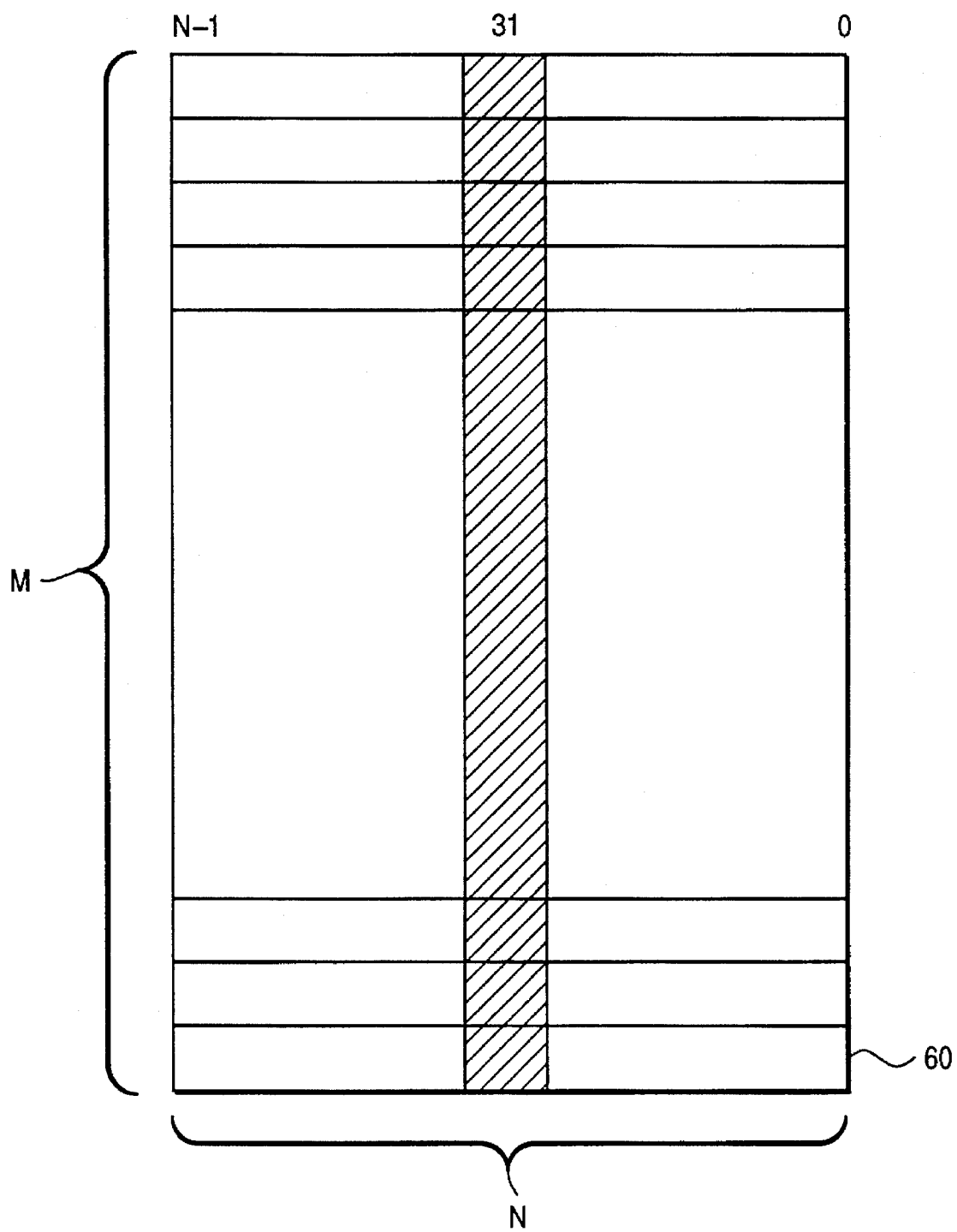
FIG_7A

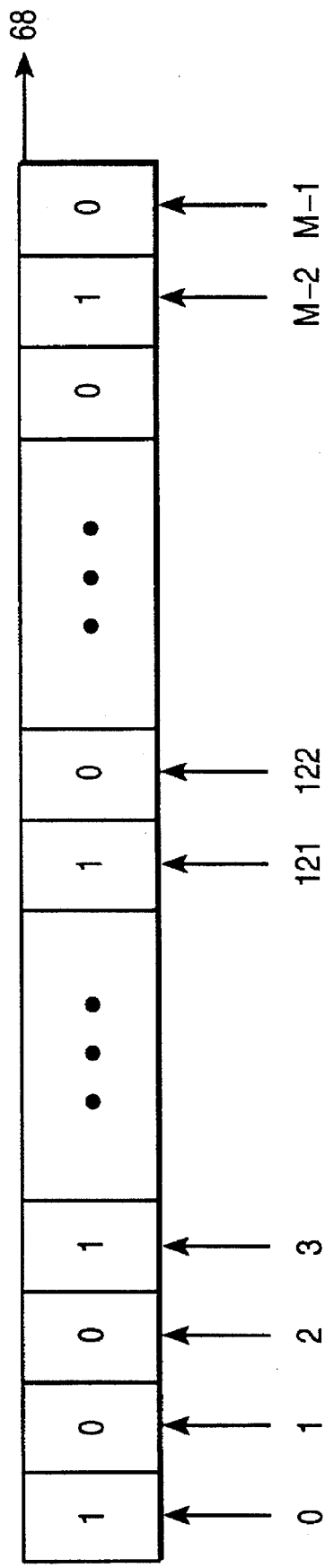
FIG._7B

|  | N-1 | 31 | 0 |
|---|---|---|---|
| 0 |  | 1 |  |
| 1 |  | 0 |  |
| 2 |  | 0 |  |
| 3 |  | 1 |  |
| ⋮ |  | ⋮ | ⋮ |
| 121 |  | 1 |  |
| 122 |  | 0 |  |
| ⋮ |  | ⋮ | ⋮ |
|  |  | 0 |  |
|  |  | 1 |  |
| M-1 |  | 0 |  |

65

FIG_7C

| OPCODE | RESPREG | SELVECT | DATASRC | RESV | MSKSRC | DIR | GPLBTERMS | MPAT | MPATBIT | RESV | BITPOS |

FIG_X

| OPCODE | INSTRUCTION |
|--------|-------------|
| 00000 | NOP |
| 00001 | SHIFT |
| 00010 | SNEXT |
| 00011 | MOVE |
| 00100 | READ |
| 00101 | READSHIFT |
| 00110 | READSNEXT |
| 01000 | WRITE |
| 01001 | WRITESHIFT |
| 01010 | WRITESNEXT |
| 01011 | WRITECOL |
| 01100 | MATCH |

FIG_9

| INSTRUCTION SET | OPERATION |
|---|---|
| NOP | NO OPERATION |
| SHIFT, SNEXT | MANIPULATE RESPONSE REGISTER A |
| MOVE | WRITE TO A RESPONSE REGISTER |
| READ, READSHIFT, READSNEXT | READ CAM |
| WRITE, WRITESHIFT, WRITESNEXT | WRITE TO CAM |
| WRITECOL | WRITE COLUMN |
| MATCH | PERFORM MASKED COMPARISON |

FIG. 10

INTEGRATED CONTENT ADDRESSABLE MEMORY ARRAY WITH PROCESSING LOGICAL AND A HOST COMPUTER INTERFACE

BACKGROUND OF THE INVENTION

A) RELATED APPLICATIONS

This application is related to an application of Charles D. Stormon, Edward Saleh, Nikos B. Troullinos and Raymond M. Leong which is filed concurrently herewith, Ser. No. 08/284,372, filed Aug. 1, 1994, and which is entitled "An Instruction Set for a Content Addressable Memory Array Integrated with a General Logic Block."

FIELD OF THE INVENTION

The present invention relates to the field of computer data processing incorporating a content addressable memory, associative storage, parallel-search storage or the like wherein high performance of data searching, processing of stored data or processing of search results is required.

B) ART BACKGROUND

In a conventional computer, processing of the contents of a memory is carried out in a single instruction single data (SISD) fashion. A single word in a memory is selected for access by an address that uniquely identifies that word. Instruction sets for the prior art have been based on selecting single operands by unique addresses with no provision for accessing multiple stored words for concurrent operations.

Content addressable memories (CAMs) are used generally in associative memory processing and specifically in computer data processing wherein it is desirable to identify the location of the data stored in the memory by specifying part or all of its contents. However, CAMs have not been popular because of high manufacturing cost and low performance of data searching and data processing.

The present invention significantly increases the performance of applications that include searching stored data and/or processing the stored data or search results. This class of problems is typically handled in prior art by software algorithms that search and process data in a serial (or a SISD) fashion. CAM array 10 in FIG. 1 of the present invention supports a concurrent search that compares all of the stored CAM words to the input data in one operation, thus implemented as single instruction multiple data (SIMD) operation. The data stored in CAM array 10 can also be processed in an SIMD fashion in accordance with the present invention. Furthermore, the present invention supports more complex operations such as finding inexact (fuzzy) matches for data that falls into a specified range.

SUMMARY OF THE INVENTION

The present invention provides an associative memory system which includes a content addressable memory (CAM) array integrated with a single instruction multiple data (SIMD) general register logic block, an SIMD interface register logic block and a general control block.

The associative memory system for concurrent data searching or concurrent data processing according to the present invention comprises a content addressable memory (CAM) array having a plurality of CAM words and a general register logic block coupled to the CAM array which comprises: (1) a multiplexer for selecting one of the input devices attached to the multiplexer and for passing an output of a selected input device as a select vector, the multiplexer coupled to said CAM array, and the input devices comprising a match latch, a multiple response resolver (MRR), a general purpose logic block (GPLB) and a unit for supplying a reference value (referred to as a supply ones unit); (2) the match latch for storing search results from said CAM array, the match latch coupled to said CAM array and to said multiplexer; (3) at least one response register A for storing search results, for being a source or a destination of a logic operation and for being a shift register, said response register A coupled to said CAM array and to said multiplexer; (4) said MRR for prioritizing said response register A, said MRR coupled to said response register A and to said multiplexer; (5) at least one response register B for storing search results and for being a source or a destination of a logic operation, said response register B coupled to said multiplexer, to said CAM array and to said response register A; (6) said GPLB coupled to said response register A, to said response register B and to said multiplexer; (7) and said supply ones unit for supplying all ones (or an alternative set of reference values) to the multiplexer, said supply ones unit coupled to the multiplexer.

The present invention further comprises a host bus coupled to the CAM array and an interface register logic block coupled to the host bus and to said CAM array wherein the interface register logic block comprises: (1) a data-in register for storing an input data pattern to be written to or to be searched on the CAM array, the data-in register coupled to said host bus; (2) a mask register for storing a mask pattern, said mask register coupled to the host bus; (3) a data-out register for storing an output data pattern, the data-out register coupled to the host bus and to the CAM array; (4) a command register for storing an instruction, said command register coupled to the host bus; (5) a control/status register for storing control and status information, the control/status register coupled to the host bus; (6) a data-source logic unit for selecting a data pattern from a group including the data-in register, the host bus, all 1's and all 0's, and for transmitting the selected data pattern to the CAM array, the data-source logic unit coupled to the host bus, to the data-in register and to said CAM array; and (7) a mask-source logic unit for selecting a mask pattern from a group including the mask register and an internally generated mask pattern, and for transmitting the selected mask pattern to the CAM array, the mask-source logic unit coupled to the mask register and to the CAM array.

In addition, the present invention comprises a general control block coupled to the general register logic block and to the interface register logic block, comprising: a state machine; a multiple response resolver enable (MRREN) input signal for enabling and disabling the MRR and for controlling register access, the MRREN input signal coupled to said state machine; a clock (CLK) input signal being used as a timing signal, said CLK input signal coupled to the state machine; a chip select (CS) input signal coupled to the state machine; a reset (RST) input signal coupled to the state machine; a write indicator (WE) input signal for controlling the movement of a data pattern, the WE input signal coupled to the state machine; an output enable (OE) input signal for enabling the host bus, the OE input signal coupled to the state machine; an access control code (AC) input signal for specifying the type of current register access, the AC input signal coupled to the state machine; a register select (RS) code input signal for selecting a register for access, the RS input signal coupled to the state machine; and a ready (RDY) output signal asserted when an output is ready to be sent, the RDY coupled to the state machine.

BRIEF DESCRIPTION OF THE DRAWINGS

FIG. 1 presents a block diagram of a content addressable memory (CAM) system according to the present invention wherein a CAM array is integrated with a single instruction multiple data (SIMD) general register logic block, an SIMD interface register logic block and a general control block.

FIG. 2 is a CAM array with M CAM words wherein each CAM word is N-bit long.

FIG. 3a is a diagram showing a first set of the states implemented in state machine 29.

FIG. 3b is a diagram showing a second set of the states implemented in state machine 29.

FIG. 4a is a chain of cascaded CAM systems.

FIG. 4b presents a multi-word feature of a CAM array.

FIG. 6a is a select vector wherein the bit positions 0, 4, 10, 20 and 87 are set to logic 1.

FIG. 6b is a CAM array wherein the CAM words at positions 0, 4, 10, 20, and 87 are written with the data "A".

FIG. 7a is a CAM array wherein column 31 is selected for a write operation.

FIG. 7b is a select vector whose contents are to be written to a column of the CAM array in FIG. 7a.

FIG. 7c is the selected column in FIG. 7a to which the contents of the select vector in FIG. 7b are written.

FIG. 8 is an instruction format that may be used in the present invention.

FIG. 9 presents a set of opcodes and instructions may be used in the present invention.

FIG. 10 presents an example of an instruction set for the CAM system in FIG. 1.

DETAILED DESCRIPTION OF THE INVENTION

Figure 5C:
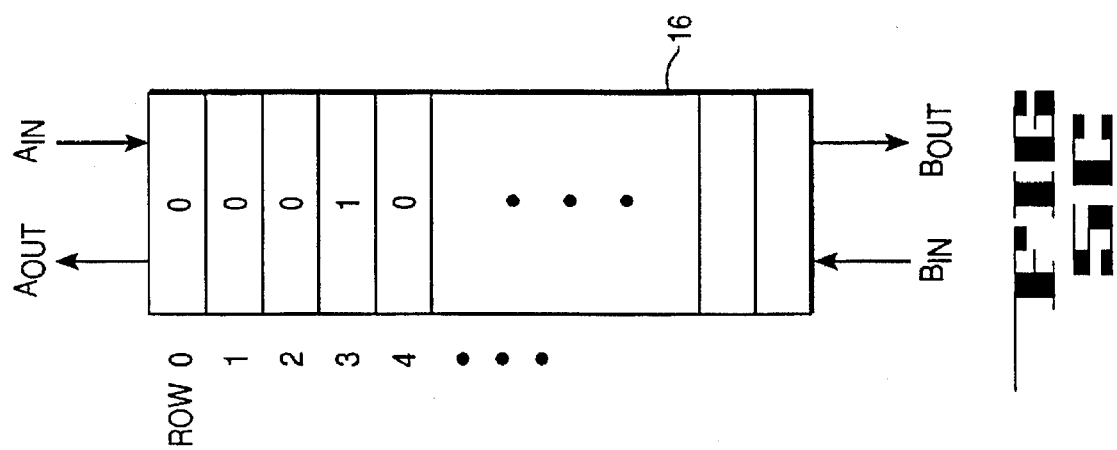
FIG. 5c is the contents of a response register A after a second match.

The present invention provides a content addressable memory (CAM) array integrated with a single instruction multiple data (SIMD) general register logic block, an SIMD interface register logic block and a general control block.

A) SYSTEM CONFIGURATION/ ORGANIZATION

FIG. 1 presents a block diagram of a CAM system in accordance with the present invention. In the preferred embodiment of the invention, the CAM system includes an array of content addressable memories (CAMs) 10, a general register logic block 11, an interface register logic block 28 and a general control block 30. The notation "/" in FIG. 1 means that a signal with the notation "/" is inverted, meaning that a signal is active when the signal is low. For example, the signal SR/ of multiple response register 13 is active when the signal is low. It should be noted that although some of the signals are inverted in the preferred embodiment of the present invention, each signal can be either inverted or non-inverted.

1) A CAM ARRAY

A CAM array 10 typically consists of a plurality of CAM words, such as M CAM words each having N bits, as shown in FIG. 2. M and N can be any positive integers. A CAM word can be of any length. For example, a CAM word can be 1-bit long, 30-bit long, 42-bit long, 64-bit long, 120-bit long, or 256-bit long, etc. Data patterns can be written or searched on CAM array 10. As will be discussed, the depth of a CAM array can be increased by cascading multiple CAM systems to increase the number of CAM words. In addition, if a data pattern is longer than the length of a CAM word, multiple adjacent CAM words can be linked to form a multi-word storage unit.

2) INTERFACE REGISTER LOGIC BLOCK

Continuing to refer to FIG. 1, interface register logic block 28 has, in the preferred embodiment of the invention, a data-in register 20, a mask register 21, a data-out register 22, a command register 23, a control/status register 24, a data-source logic unit 25 and a mask-source logic unit 26. Interface register logic block 28 provides a means for interfacing CAM array 10 to a host bus 31 for instructions and data transfers as well as generation of mask patterns. Masking is a logical technique in which certain bits of a word are blanked out or inhibited. In the preferred embodiment of the present invention, data-in register 20, mask register 21 and data-out register 22 contain 42 bits in each register, and command register 23 and control/status register 24 contain 32 bits in each register. However, it should be noted that a register can be of any length.

Host bus 31 couples various external logic devices (not shown) including, but not limited to, a keyboard, a mouse, a monitor, a printer and a central processing unit to data-source logic unit 25, data-in register 20, mask register 21, data-out register 22, command register 23 and control/status register 24. Host bus 31 can hold an input data pattern, an output data pattern, a mask pattern or an instruction. There are many ways to drive host bus 31. The CAM system outputs data to host bus 31 when the following conditions exist: (1) an output enable (OE/) signal in general control block 30 is asserted, (2) a chip select (CS/) signal is asserted, (3) a write (WE/) indicator is deasserted, and (4) a register bank read access or a valid READ, READSHIFT or READ-SNEXT instruction is being executed. A host device including, but not limited to, a CPU, a state machine or other external logic such as a controller will drive host bus 31 to write a data pattern into a CAM register or to data-source logic unit 25, to write an instruction to be executed by the CAM system, or to receive data from the CAM system.

Data-in register 20 receives and stores a data pattern to be written to or to be searched on CAM array 10 from host bus 31. Mask register 21 accepts a mask pattern to be used to mask out certain bits in the data pattern. Data-source logic unit 25 is a multiplexer that can select a data pattern from data-in register 20 or from host bus 31. After selecting a data pattern, data-source logic unit 25 transmits the data pattern to CAM array 10. Data-source logic unit 25 can also provide all 1's or all 0's to CAM array 10 so that every bit of the CAM words in CAM array 10 will be set to either 1 or 0. Mask-source logic unit 26 selects a mask pattern either from mask register 21 or from an internally generated mask pattern according to the instruction stored in command register 23, and transmits the selected mask pattern to CAM array 10. Data-source logic unit 25 and mask-source logic unit 26 together produce and transmit to CAM array 10 a masked data pattern for masked comparisons or masked write operations.

Data-out register 22 latches the last data word read from CAM array 10. A data word can also be read directly from CAM array 10 when CAM array 10 transmits a data word directly to host bus 31. Command register 23 contains an instruction that can be executed by the CAM system. Control/status register 24 can hold various control and status information. For instance, control/status register 24 may include the status information regarding whether a match has occurred after a match operation. If a match is found, control/status register 24 can also indicate the identification number of the CAM array in a cascaded CAM system chain where the match is found and the location of the particular CAM word found in the CAM array.

Interface register logic block 28 provides two-way communications between host bus 31 and a group of registers including Data-in register 20, mask register 21, data-out register 22, command register 23 and control/status register 24 so that not only data can be written to or read from a register but also the contents of each register can be validated by host software, if needed. Interface register logic block 28 also provides one-way communications from host bus 31 to data-source logic unit 25 and from CAM array 10 to host bus 31. Interface register logic block 28 accommodates any differences between the width of host bus 31 and the length of a CAM word. In addition, the width of an internal bus in interface register logic block 28 may be different from the width of host bus 31 or the length of a CAM word.

3) GENERAL REGISTER LOGIC BLOCK

General register logic block 11 in FIG. 1 has, in the preferred embodiment of the invention, a match latch (ML) 17, a multiple response resolver (MRR) 13, a general purpose logic block (GPLB) 14, a supply ones (or an alternative reference value) unit 19, a multiplexer 12 and three response registers—response register A 16, response register B 15' and response register C 15". General register logic block 11 provides a means for reading CAM array 10, and a means for writing to CAM array 10 in parallel (or in a SIMD fashion), and a means for performing logic operations on the contents of the three response registers. In one embodiment, general register logic block 11 includes at least one response register. In another embodiment, general register logic block 11 includes more than three response registers. In yet another embodiment, there are no response registers per se—only a match latch and the ability to produce a select vector according to the contents of the match latch or its inverted contents.

Referring to FIG. 1, match latch 17 is coupled to CAM array 10 and multiplexer 12. Match latch 17 contains at least as many bits as the number of CAM words in CAM array 10. Match latch 17 retains the result of a match operation, which is a search and comparison operation, performed on CAM array 10. The contents of match latch 17 can be used to select CAM words in CAM array 10 for access or are written to response register A 16, response register B 15' or response register C 15". Match latch 17 can be cleared by either a power-on reset or a reset operation initiated by the RST/ input in general control block 30. If a match is found, an inverted match output (MATCH/) is asserted.

Response register A 16 can have each bit assigned to each CAM word in CAM array 10. For illustration, if CAM array 10 contains 1024 CAM words, then although response register A 16 can have more than 1024 bits, it typically contains 1024 bits. Response register A 16 can have one or more bits set to logic 1 or contain all zero bits. Response register A 16 can be used to store the result of a match operation. The contents of response register A 16 is automatically prioritized by MRR 13. Response register A 16 can also be the source and/or the destination of a logic operation including a multi-word operation. If GPLB 14 is used in a logic operation, then the output of GPLB 14 can modify the contents of response register A 16. In addition, Response register A 16 can be shifted up or down one bit position per shift instruction. This is useful in initializing CAM array 10, accessing a cascaded CAM array structure or shifting one bit in response register A 16 after a read or a write operation. The most significant bit in response register A 16 can be cleared to access the next CAM word. Response register A 16 is cleared by either a power-on reset or a reset operation initiated by the RST/input in general control block 30.

An above-input (AIN) signal, an above-output (AOUT) signal, a below-input (BIN) signal and a below-output (BOUT) signal of response register A 16 are utilized when multiple CAM systems are cascaded as shown in FIG. 4a. An AIN signal is coupled to a BOUT signal of the next higher priority CAM system in a cascaded CAM system chain. An AOUT signal is coupled to a BIN signal of the next higher priority CAM system in a cascaded CAM system chain. A BIN signal is connected to an AOUT of the next lower priority CAM system in a cascaded CAM system chain. Finally, a BOUT signal is connected to an AIN of the next lower priority CAM system in a cascaded chain. A cascaded CAM system will be discussed in detail later.

MRR 13 is used as a priority encoder for response register A 16. If response register A 16 is non-zero, MRR 13 has one bit set corresponding to the most significant bit set in response register A 16. On the other hand, if response register A 16 contains all zero bits, then MRR 13 is set to all zeros, and no CAM word is selected for a read operation. When the most significant bit set in response register A 16 is cleared, MRR 13 reprioritizes the contents of response register A16 and selects the next CAM word for access. After MRR 13 processes the contents of response register A 16, MRR 13 sends the result to multiplexer 12. The result of MRR 13 typically contains, although is not restricted to, the same number of bits as the number of CAM words in CAM array 10. An inverted some-response (SR/) output is asserted if response register A 16 contains at least one bit set, indicating that at least one match is found. SR/ is deasserted during reset. An inverted multiple-response (MR/) output is asserted if response register A 16 contains two or more bits set indicating that more than one match is found. MR/ is deasserted during reset. An inverted multiple response resolver enable (MRREN/) input has no effect on SR/ or MR/. If the MRREN/input is deasserted, MRR 13 becomes disabled, setting MRR 13 to all zeros. Disabling MRR 13 is useful in a read operation when multiple CAM systems are cascaded, as will be discussed.

Each of response register B 15' and response register C 15" can have, but is not restricted to, the same number of bits as the number of CAM words in CAM array 10. Response register B 15' and response register C 15" may contain identical data. Each register can be used to store the result of a match operation and act as the source and/or destination of a logic operation. The contents of either response register B 15' or response register C 15" can be modified by the output of GPLB 14 if either response register B 15' or response register C 15" is selected to be the destination of the logic operation of GPLB 14.

GPLB 14 contains various general purpose logic components to process contents of any single register or any combination of registers selected from response register A 16, response register B 15' and response register C 15". GPLB 14 consists of a plurality of arithmetic logic units (ALUs) with one ALU assigned to each CAM word in CAM array 10. GPLB 14 can perform one of many different Boolean operations on the contents of response register A 16, response register B 15' and response register C 15". In the preferred embodiment of the present invention, there are 256 different Boolean operations. The output of GPLB 14 can be stored back to one of the response registers 16, 15' and 15" or used to select CAM word(s) in CAM array 10 during a write operation. All ALUs perform the operation specified by the instruction.

Continuing to refer to FIG. 1, another component of general register logic block 11 is supply ones unit 19. Supply ones unit 19 is used to provide all ones (or alternatively all zeros if zeros select CAM locations) to select vector 18 so that every CAM word can be selected for a write operation. Supply ones unit 19 can be also used to initialize CAM array 10.

Multiplexer 12 is used to select one of the input devices—match latch 17, MRR 13, GPLB 14 and supply ones unit 19—and to create an output called select vector 18 containing the data from the selected input device. Select vector 18 is then used to select corresponding CAM word(s) for access. When multiplexer 12 selects match latch 17, the contents of match latch 17 are transferred to select vector 18. Multiplexer 12 can also select MRR 13 to transfer the result of MRR 13 to select vector 18. When multiplexer 12 selects GPLB 14, the result of a logical combination of response registers 16, 15' and 15" is transferred to select vector 18. Finally, when multiplexer 12 selects supply ones unit 19, all bits in select vector 18 become logic 1.

4) GENERAL CONTROL BLOCK

Continuing to refer to FIG. 1, general control block 30 has, in the preferred embodiment of the invention, an inverted multiple response resolver enable (MRREN/) signal, a clock (CLK) signal, an inverted chip select (CS/) signal, an inverted reset (RST/) signal, an inverted write (WE/) indicator, an inverted output enable (OE/), an access control code (AC), a register select (RS) code, an inverted ready output (RDY/) and a state machine 29. General control block 30 supplies various input/output control signals to the CAM system to enable or disable registers and logic units in the CAM system and receives externally supplied control signals (e.g., CLK, CS/, RST/, WE/, OE/, AC, and RS) from the external logic to which the CAM system is coupled.

FIGS. 3a and 3b are diagrams showing the states implemented in state machine 29.

Referring to a block 501 in FIG. 3a, assertion of the chip select (CS/) signal, which is a logic LOW in the preferred embodiment of the present invention, at the rising edge of CLK enables the on-chip logic components to accept commands and accesses initiated by external logic. If the command or access is valid, then CS/ will not be sampled again until the rising edge of CLK after the operation is completed. If the command or access is invalid, then CS/ will be sampled on the next rising edge of CLK.

Referring to block 502 in FIG. 3a, if MRREN/ is asserted, indicating a logic LOW in the preferred embodiment of the present invention, at the rising edge of CLK in the first clock cycle of an instruction, then MRR 13 is enabled, and the CAM word corresponding to the most significant bit set in response register A 16 is selected for a read operation. If MRREN/ is deasserted, indicating a logic HIGH in the preferred embodiment of the present invention, MRR 13 is disabled, and no CAM word can be selected for a read operation regardless of the contents of response register A 16. MRREN/ affects register access when access control codes are set to "11". MRREN/ is also loaded into a MRREN_FF/internal flip-flop when a READ, READ-SHIFT or READSNEXT instruction is executed.

CLK is a clock signal used as a timing signal by the CAM system logic components.

Referring to block 503, assertion of the reset (RST/) signal for one or more consecutive rising edges of CLK causes a CAM system to complete a reset operation, which places state machine 29 and all other CAM system logic components to a known state. Match latch 17 is cleared so that MATCH/ becomes a logic HIGH and stays HIGH until the first match operation with a non-empty outcome. Response register A 16 is cleared to zero so that MR/ and SR/ become HIGH. AOUT and BOUT become logic LOW as a result of response register A 16 being cleared. The SR/, MR/, MATCH/and MRREN_FF/bits in the control/status register are set to one while the AOUT and BOUT bits in the control/status register are set to zero.

Referring to block 504, the write (WE/) indicator is sampled in the same fashion as CS/ is sampled. If WE/ is HIGH, information requested by logic external to the CAM system will be driven onto host bus 31 by the CAM system. If WE/ is LOW, then data presented at host bus 31 will be stored in location(s) specified by the external logic. When the output enable (OE/) signal is deasserted, host bus 31 will be placed in a three-state condition.

Now referring to block 505 in FIG. 3b, the access control code (AC), which is sampled in the same fashion as CS/ is sampled, specifies the type of current register access. For illustration, when AC is "00", a register access is based on CS/, WE/and the RS code. When AC is "01" the CAM system executes the instruction in command register 23. When AC is "10", the CAM system executes the instruction presented at host bus 31. Finally, when AC is "11", a register access is based on CS/, WE/, RS, MRREN/ and MRREN_FF/. When AC is "11", the contents of data-in register 20, mask register 21 or command register 23 can be read based on CS/ and MRREN/. Also when AC is "11", data-out register 22 can be read based on CS/ and MRREN_FF/. In addition, control/status register 24 can be read or written when AC is "11".

Referring to block 506, the register select (RS) code, which is also sampled in the same fashion as CS/ is sampled, is used to select a register for access. For illustration, when AC is "00" or "11", the register selected by the RS code is accessed. When the RS code is "000", the low order bits of data-in register 20 are selected. If data-in register 20 contains 42 bits, and host bus 31 is 32 bit wide, then the low order 32 bits of data-in register 20 will be selected. When the RS code is "001", the high order bits of data-in register 20 are selected for access. When the RS code is "010", the low order bits of mask register 21 are selected. When the RS code is "011", then the high order bits of mask register 21 are selected. When the RS code is "100", the low order bits of data-out register 22 are selected. When the RS code is "101", the high order bits of data-out register 22 are selected. When the RS code is "110", command register 23 is selected for access. When the RS code is "111", control/status register 24 is selected for access.

Referring to block 507, the ready output (RDY/) is asserted when an output is ready to be sent or when the CAM system completes a CAM operation specified by a CAM instruction. RDY/ is typically asserted during the last clock cycle of the current operation that is being performed. In the preferred embodiment of the present invention, when AC is "00", RDY/ will be generated regardless of whether an active CS/ is present. In all other access modes, CS/ must be active in order for RDY/ to be generated.

State machine 29 consists of various logic units to process signals coupled to State machine 29 and to interface input/ output signals of State machine 29 with general register logic block 11 and with interface register logic block 28. This state machine 29 generates the necessary control signals for logic blocks 11 and 28 and the various registers within these blocks and the multiplexer 12.

B) FUNCTIONAL DESCRIPTION

1) CASCADING MULTIPLE CAM SYSTEMS

Multiple CAM systems can be cascaded to increase the depth of CAM array 10 (e.g., to increase the number of CAM words). For instance, in FIG. 4a, four CAM systems are cascaded. If each CAM system has 1024 CAM words in its CAM array, then the cascaded CAM system chain provides 4096 (1024 * 4) CAM words. To increase the number of CAM words further, more CAM system can be added. It should be noted that a CAM system in a cascaded chain does not need the same number of CAM words in its CAM system as other CAM systems in the cascaded chain. A cascaded structure provides means to access a single CAM system or multiple CAM systems.

Cascading multiple CAM systems is accomplished by connecting the top-most and the bottom-most bits of a response register A of a CAM system to the upper and lower CAM system in the cascaded chain, respectively. For example, in FIG. 4a, the AIN signal of CAM system 1 is connected to the BOUT signal of CAM system 0. The AOUT signal of CAM system 1 is connected to the BIN signal of CAM system 0. The BOUT signal of CAM system 1 is connected to the AIN signal of CAM system 2. The BIN signal of CAM system 1 is coupled to the AOUT of CAM system 2. In addition, each of the AIN signal of the first CAM system (CAM system 0) and the BIN signal of the last CAM system (CAM system 3) is typically connected to the output of a user-programmable flip-flop or register. The chain structure as shown in FIG. 4a can provide cascading capability during shift, select next and multi-word operations.

Continuing to refer to FIG. 4a, in a cascaded system, the MATCH/ outputs of all CAMs can be tied together to provide a cumulative match signal.

By controlling MRREN/ signals of CAM systems in a chain, one can read a CAM word from one CAM system while disabling other CAM systems in the chain. As discussed before, the SR/ and MR/ signals reflect the state of MRR 13 in FIG. 1. The MRREN/ signal can enable or disable MRR 13. If MRREN/ is HIGH, then no CAM word is read from the CAM array. On the other hand, if MRREN/ is LOW, then a CAM word can be read from the CAM array. In a cascaded system, additional signals such as global_MR/, global_SR/ and global_MRREN/ are provided to integrate individual MR/, SR/ and MRREN/ signals as illustrated in FIG. 4a. In operation, each MRREN/ may be set HIGH or LOW according to the logic described below:

MRREN0/ is LOW if SR0/ is LOW, and global_MRREN/ is LOW.

MRREN1/ is LOW if SR0/ is HIGH, SR1/ is LOW, and global_MRREN/ is LOW.

MRREN2/ is LOW if SR0/ is HIGH, SR1/ is HIGH, SR2/ is LOW, and global_MRREN/ is LOW.

MRREN3/ is LOW if SR0/ is HIGH, SR1/ is HIGH, SR2/ is HIGH, and global_MRREN/ is LOW.

2) MULTI-WORD OPERATION

If a data pattern is longer than the length of a CAM word, then the data pattern can be stored in two or more adjacent CAM words that are linked to form a multi-word storage unit. For example, if the length (N) of a CAM word of CAM array 37 in FIG. 4b is 42-bit long, and the data pattern contains 100 bits, then the data pattern will occupy three CAM words. Thus, in FIG. 4b, a data pattern D1 occupies three CAM words, and the next data pattern D2 occupies the next three CAM words following the last CAM word occupied by D1. This multi-word feature allows a match operation to be performed on data of arbitrary length independent of the number of bits each CAM word contains in a given array. In one embodiment, the length of data pattern D1 may be different from the length of data pattern D2.

Matching a data pattern such as D1 in FIG. 4b against external arguments requires multiple match cycles—one match cycle for each CAM word. A multi-word means collates the match results and provides a cumulative match indicator. For illustration, if data pattern D1 occupies three CAM words as in FIG. 4b, and if a CAM word is 42-bit long, then the first CAM word that D1 occupies is identified by an ID of 00 in bit positions 40 and 41. Similarly, the second and the third CAM words of D1 are identified by ID codes 01 and 10, respectively. Because the data pattern is three words long, three match cycles are needed to match them against an external argument. The first match is conducted with a search pattern containing 00 at bit positions 40 and 41 plus 40 bits of data pattern and with response register A 16 as the response register. The second match is conducted with a search pattern containing an ID of 01 at bit positions 40 and 41 plus 40 bits of data pattern and with response register A 16 as a "multi-word" response register. By specifying response register A 16 as the "multi-word" response register, the current match result of each CAM word (e.g., word x) in CAM array 10 is logically ANDed with the previous match result of the CAM word above it (e.g., word x−1) before they are stored into response register A 16. The previous match result of CAM word x is stored in bit position x−1 of response register A16.

Figure 5B:
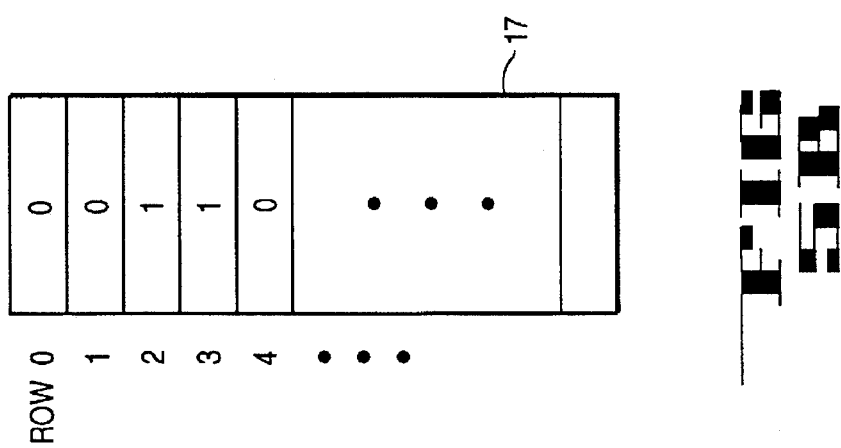
FIG. 5b is the contents of a match latch after a second match.
Figure 5A:
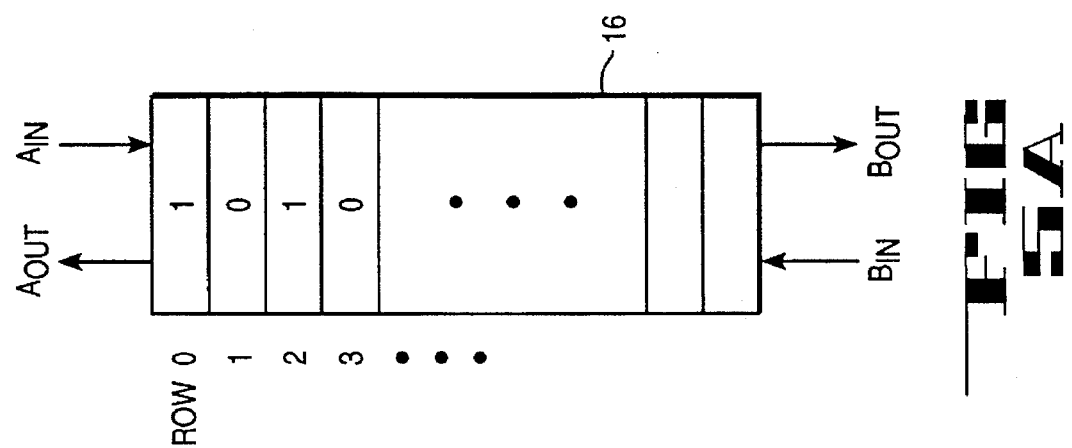
FIG. 5a is the contents of a response register A after a first match.

This is illustrated in FIGS. 5a–5c. FIG. 5a shows the contents of response register A 16 after the first match. FIG. 5b shows the contents of match latch 17 after the second match. When response register A 16 is specified as the "multiword" response register, the contents of each row of match latch 17 are ANDed with the contents of each row above the current row of response register A 16. For example, the contents of row 1 of match latch 17 in FIG. 5b, which is 0 in this case, is ANDed with the contents of row 0 of response register A 16 in FIG. 5a, which is 1. The result (0) of the AND operation is written to row 1 of response register A 16, as shown in FIG. 5c. Similarly, the contents of row 3 (1) of match latch 17 is ANDed with the contents of row 2 (1) of response register A 16, and the result (1) is stored in row 3 of response register A 16. The contents of the other rows are also ANDed in a similar manner. The contents of row 0 of match latch 17 is ANDed with the contents of AIN of response register A 16.

The third match is processed in a similar way as the second match except with an ID code of 10 at bit positions 40 and 41 in the search pattern. After the third match, the only data pattern(s) which matched all three search arguments are identified by a set bit (1) in response register A 16.

3) ACCESSING THE CAM ARRAY

A CAM system according to the present invention incorporates a select vector to choose one or more CAM words in CAM array 10 for access. A Select vector 18, which is the output of multiplexer 12, has at least the same number of bits as the number of CAM words in CAM array 10 so that each bit in select vector 18 can be assigned to each CAM word in CAM array 10. For instance, if a CAM array 10 has M CAM words, then a select vector 18 has at least M bits. If there are 1024 CAM words in CAM array 10, then select vector 18 is 1024-bit long so that there is one-to-one correspondence between 1024 bits in select vector 18 and 1024 CAM words in CAM array 10. Although a select vector usually contains exactly the same number of bits as the number of CAM words in a CAM array, select vector 18 may have more bits than the number of CAM words in CAM array 10, in which case, the extra bits in select vector 18 will not be used to access CAM words. So if there are 600 bits in select vector 18, but there are only 512 CAM words in CAM array 10, then the extra 88 bits (600–512) are not used in accessing CAM words. But select vector 18 cannot have less number of bits than the total number of CAM words in CAM array 10 because in this case, those CAM words without corresponding select vector bits cannot be accessed.

Select vector 18 has four essential functions: First, select vector 18 (which is typically a signal presented to the CAM 10) can select one or more CAM words for a write operation because of its one-to-one correspondence between the bits in select vector 18 and the CAM words in CAM array 10. Thus, a write operation can be performed in a single instruction multiple data (SIMD) fashion. The contents of the select vector 18 determine which CAM word(s) will be accessed. For instance, if the first bit of select vector 18 is a logic 1, then the first CAM word of CAM array 10 will be accessed. If bit positions 0, 4, 10, 20 and 87 of a select vector 58 are logic 1, then the CAM words of a CAM array 50 at positions 0, 4, 10, 20 and 87 will be accessed as shown in FIGS. 6a and 6b. In FIG. 6b, letter "A" is written on the first, fifth, eleventh, twenty-first and eighty-eighth CAM words in CAM array 50 to indicate those CAM words are being accessed.

During a write operation if multiplexer 12 selects match latch 17 holding the result of the most recent match operation, select vector 18 will contain one or more bits corresponding to the CAM word(s) previously matched in CAM array. The contents of either data-in register 20 or host bus 31 according to the instruction will be stored into the CAM word(s) selected by match latch 17.

On the other hand, during a write operation if multiplexer 12 selects MRR 13, then select vector 18 will have only one bit set for the one CAM word indicated by MRR 13, or select vector 18 will have no bits set because all bits in MRR 13 are zeros. The contents of either data-in register 20 or host bus 31 will be stored into the CAM word selected by MRR 13. However, if the MRREN/ signal of MRR 13 is deasserted, then no location will be written.

During a write operation if multiplexer 12 selects GPLB 14, then the result of the logic function specified in the instruction determines the CAM word(s) to be written. Select vector 18 will contain the result of GPLB 14, and the contents of either data-in register 20 or host bus 31 will be stored into the CAM word(s) selected by GPLB 14.

During a write operation if multiplexer 12 selects supply ones unit 19, then select vector 18 will be set to all ones in the preferred embodiment, and the contents of either data-in register 20 or host bus 31 will be stored into every CAM word in CAM array 10.

Second, select vector 13 can be used to select one CAM word for a read operation. During a read operation, one bit of select vector 18 is set according to the output of MRR 13, and the contents of the selected CAM word is transmitted to data-out register 22 and/or to host bus 31 directly. However, if the result of MRR 13 is all zero either because response register A 16 contains all zero bits or because the MRREN/ signal of MRR 13 is deasserted, then no CAM word will be selected for reading.

Third, select vector 18 can also be the data source for a write operation to response register A 16, response register B 15' or response register C 15".

Finally, the contents of select vector 18 can be written into a whole column of CAM array 10. For illustration, FIG. 7a presents a CAM array 60 with M CAM words, each CAM word having N number of bits. After a column such as column 31 is selected, the contents of a select vector 68 in FIG. 7b are written to column 31 shown in FIG. 7c. Logic values "1" and "0" are inserted in select vector 68 and column 31 to merely show one-to-one correspondence between select vector 68 and column 31. The logic values of column 31 are not limited to the example shown in FIG. 7c.

4) MATCH OPERATIONS

A CAM system according to the present invention supports two types of match operations: a Bit Match operation and a Multiple Valued Variable (MVV) Match operation. A match operation can be performed in a SIMD fashion so that all of the stored CAM words can be compared to a data pattern in a single operation.

In a Bit Match operation, a data pattern qualified by a mask pattern is compared against the contents of CAM array 10 in FIG. 1 on a bit-by-bit basis. Masked bits (e.g., bits set to 1) in the mask pattern are not compared. The result of the Bit Match operation is stored into Match Latch 17 and one of the response registers 15', 15" and 16 as specified by a MATCH instruction. The source of the data pattern is also specified in a MATCH instruction. The following are the possible sources of a data pattern: the contents of data-in register 20, data presented at host bus 31, an internally generated data pattern containing all zeros, or an internally generated data pattern containing all ones. The internally generated data patterns are produced in data-source logic unit 25.

In addition, a MATCH instruction specifies the source of the mask pattern. The following are the possible sources of a mask pattern: the contents of mask register 21, an internally generated fill pattern, an internally generated mark pattern, or the logically ANDed product of an internally generated mask pattern and the contents of mask register 21.

Two types of internally generated mask patterns am supported: fill patterns and mark patterns. A fill pattern may consist of (1) one or more zeros in low order bit positions followed by all ones, (2) one or more ones in low order bit positions followed by all zeros, (3) all zeros, or (4) all ones. For example, a fill pattern may look like 1111 . . . 110, 11110 . . . 000, 0000 . . . 001, 0001 . . . 111,000 . . . 000 or 111 . . . 111. The number of ones and zeros in a pattern is specified in the MATCH instruction. A mark pattern consists of a single one embedded in a word of zeros or a single zero embedded in a word of ones. The position of the single mark bit and the binary value of the remaining word are specified in the MATCH instruction. Some examples of a mark pattern may be 111 . . . 11011, 011 . . . 111 or 00100 . . . 000.

In a Multiple Valued Variable (MVV) Match operation, MVVs are formed by grouping two or more CAM bits in each CAM word, and these MVVs are compared with the MVVs formed from the contents of data-in register 20 and mask register 21. A quad variable is an example of a MVV. For example, if a CAM word is 42-bit long, then each CAM word can be paired to form 21 2-bit quad values. Each quad variable supports four states. For example 00 can represent logic zero (0), 11 can represent logic one (1), 10 can represent don't care (X) and 01 can represent never match (N).

C) INSTRUCTION SET

FIG. 10 describes an example of an instruction set for the CAM system in FIG. 1 according to the present invention. An NOP instruction performs no operation.

A SHIFT instruction either shifts response register A 16 up or down by one bit position according to the instruction. This is useful for initializing CAM array 10 in FIG. 1 or accessing data patterns stored in multiple adjacent CAM words. The SHIFT operation can be combined with a read (READSHIFT) or write (WRITESHIFT) operation.

An SNEXT instruction (which may be referred to as a "selectnext instruction") clears the most significant bit set in response register A 16. If multiplexer 12 selects MRR 13, then the SNEXT instruction, in effect, selects the next CAM word indicated by response register A 16 for access. The SNEXT operation can also be combined with a read (READSNEXT) or a write (WRITESNEXT) operation.

A MOVE instruction writes the contents of select vector 18 to response register A 16, response register B 15' or response register C 15" as specified in the instruction.

A READ instruction uses response register A 16 and MRR 13 to read one CAM word. MRR 13 prioritizes the contents of response register A 16. If response register A 16 has one or more bits set to logic 1, then MRR 13 has one bit set that corresponds to the highest priority bit set in response register A 16. Thus, a CAM word corresponding to the highest priority bit set in response register A 16 will be read from CAM array 10. CAM array 10 can either transmit the contents of the selected CAM word to data-out register 22 and/or to host bus 31 directly. If, however, response register A 16 contains all zero bits, then MRR 13 sends all zeros to multiplexer 12, and no CAM word is selected for reading.

A READSHIFT instruction combines the READ instruction and the SHIFT instruction. After a read operation, response register A 16 is shifted either up or down by one bit according to the instruction.

A READSNEXT instruction combines the READ instruction and the SNEXT instruction. When the READSNEXT instruction is called, a read operation is performed first, and then the most significant bit set in response register A 16 is cleared.

A WRITE instruction performs a masked write operation to every CAM word indicated by a bit set in select vector 18. Multiplexer 12 selects an input device from the group consisting of match latch 17, MRR 13, GPLB 14 and supply ones unit 19, and passes the data from the selected input device to select vector 18. A masked data pattern from data-source logic unit 25 and from mask-source logic unit 26 is written to every CAM word in CAM array 10 designated by select vector 18.

A WRITESHIFT operation combines the WRITE instruction and the SHIFT instruction. After a write operation, response register A 16 is shifted either up or down by one bit according to the instruction.

A WRITESNEXT instruction combines the WRITE instruction and the SNEXT instruction. When the WRITESNEXT instruction is executed, a write operation is performed first, and then the most significant bit set in response register A 16 is cleared.

A WRITECOL instruction writes the contents of select vector 68 as a column to CAM array 60 as shown in FIGS. 7a, 7b and 7c. For every CAM word, one bit from select vector 68 is written to a CAM word in a bit position specified by the instruction. As a consequence, CAM array 60 can be used as storage for the contents of the select vector.

A MATCH instruction exercises the content addressable function by performing a masked comparison of data in every CAM word with a specified search pattern provided by data-source logic unit 25 and mask-source logic unit 26 in FIG. 1. Upon completion of the MATCH instruction, the results are stored in match latch 17, the contents of which can be written to response register A 16, response register B 15' or response register 15". It should be noted that a MATCH instruction that searches for logic 1's in a specified bit position by masking all other bit positions is equivalent to a read column instruction.

D) INSTRUCTION FORMAT

An instruction for a CAM system according to the present invention may contain the following format as shown in FIG. 8. It should be noted that this format is shown as an example, and them are numerous other instruction formats that the present invention can realize.

An OPCODE field in FIG. 8 contains binary codes for one of the instructions. Instructions may be represented by opcodes as shown in FIG. 9. In this example, opcode "00001" represents the SHIFT instruction, opcode "01100" represents the MATCH instruction.

A RESPREG selects one of the three response registers 15', 15" and 16 or response register A 16 as a "multi-word" response register.

A SELVECT field specifies an input device to be selected by multiplexer 12. The input device that can be specified in the SELVECT field is one of the following: match latch 17, MRR 13, GPLB 14 and supply ones unit 19.

A DATASRC field specifies the source of a data pattern to be selected by data-source logic unit 20 for the WRITE or MATCH instruction. Data-source logic unit 25 may choose any of the four possible data sources: data-in register 20, host bus 31, internally generated patterns consisting of all ones, or internally generated patterns consisting of all zeros.

A RESV field is an empty field that can be reserved for other purposes.

A MSKSRC field specifies the source of a mask pattern to be selected by mask-source logic unit 26 for the WRITE or MATCH instruction. Mask-source logic unit 26 can select any of the following sources: mask register 21, an internally generated fill pattern, an internally generated mark pattern, or the logically ANDed product of an internally generated pattern and the contents of mask register 21.

A DIR field specifies the direction of the SHIFT operation. For instance, a bit 0 may indicate shifting of the contents of response register A 16 up by one bit. A bit 1 may indicate shifting of the contents of response register A 16 down by one bit.

A GPLBTERMS field specifies one of the Boolean operations to be performed by GPLB 14 on the contents of the response registers 15', 15" and 16. In the preferred embodiment of the present invention, the output of an 8-bit GPLBTERMS field may be determined by:

$$(f7 * R3 * R2 * R1) + (f6 * R3 * R2 * R1/) +$$
$$(f5 * R3 * R2/ * R1) + (f4 * R3 * R2/ * R1/) +$$
$$(f3 * R3/ * R2 * R1) + (f2 * R3/ * R2 * R1/) +$$
$$(f1 * R3/ * R2/ * R1) + (f0 * R3/ * R2/ * R1/)$$

Where f7-f0 are the 8 bits of the GPLBTERMS field wherein f0 is the most significant bit; R1, R2 and R3 are the contents of the response registers 15', 15" and 16, respectively; and R1/, R2/ and R3/ are the inverted contents of the response registers 15', 15" and 16. For example, if R1 is 1000100111, then R1/ is 0111011000.

A MPAT field selects one of the two types of internally generated mask patterns: a fill pattern or a mark pattern. A MPATBIT field specifies the value (1 or 0) of the "fill" bits in a fill pattern or the "mark" bit in a mark pattern. A BITPOS specifies the location of the fill bits or the mark bit. For instance, if the MPAT, MPATBIT and BITPOS fields contain 0 1 5, then a fill pattern is selected with 1's in bit positions 0–5 (e.g., 000 . . . 00111111 where the least significant bit is the right most bit). If the MPAT, MPATBIT and BITPOS fields contain 0 0 41, and a pattern is 42-bits long, then a fill pattern is selected with 0's in bit positions 0–41 (e.g., 000000 . . . 000000). If the MPAT, MPATBIT and BITPOS fields contain 1 0 3, then a mark pattern is selected with a zero at bit position 3 in a word of ones (e.g., 1111 . . . 1110111). If the MPAT, MPATBIT and BITPOS fields contain 1 1 7, then a mark pattern is selected with a one at bit position 7 in a word of zeros (e.g., 000 . . . 0010000000).

A CAM system of the present invention is ideal for various data intensive computations such as pattern recognition, data base systems, neural networks, text processing, digital noise suppression, and address matching in Local Area Networks.

While the present invention has been particularly described with reference to FIGS. 1–10, it should be understood that the figures and the table are for illustration only and should not be taken as limitations upon the invention. It is further contemplated that many changes and modifications may be made to the invention, by one of ordinary skill in the art, without departing from the spirit and scope of the invention as disclosed herein.

We claim:

1. An associative processing memory system for concurrent data searching and concurrent data processing comprising:

a content addressable memory (CAM) array having a plurality of CAM words;

a general register logic block coupled to said CAM array, said general register logic block comprising:

a multiplexer which executes one of a plurality of input devices attached to said multiplexer and passes an output, representing a select vector, of one of said plurality of input devices, said multiplexer coupled to said CAM array, and said plurality of input devices comprising a match storage circuit, a prioritizer, a general purpose logic block (GPLB) and a reference value unit, said match storage circuit which stores search results from said CAM array, said match storage circuit coupled to said CAM array and to said multiplexer, a plurality of response registers which receive data from said multiplexer, said plurality of response registers coupled to said CAM array, to said multiplexer and to said GPLB, said prioritizer which prioritizes said plurality of response registers, said prioritizer coupled to said plurality of said response registers and to said multiplexer, said GPLB which performs logical operations, said GPLB coupled to said multiplexer, and said reference value unit for supplying reference values to said multiplexer, said reference value unit coupled to said multiplexer; and an interface register logic block coupled to said CAM array, said interface register logic block comprising:

a command register which stores an instruction, a control and status register which stores control and status information, a data-in register which stores an input data pattern to be written to or to be searched on said CAM array, a mask register which stores a mask-source logic pattern, a data-out register which stores an output data pattern, said data-out register coupled to said CAM array, and a mask-source logic unit that selects said mask pattern from the group consisting of said mask register and an internally generated mask pattern, and transmits said selected mask pattern to said CAM array.

2. The associative processing memory system of claim 1 wherein said interface logic block further comprises a data-source logic unit coupled to said data-in register and to said CAM array, and wherein said data-source logic unit selects a source logic data pattern from the group consisting of data patterns from said data-in register, all 1's and all 0's, and transmits said selected data pattern to said CAM array.

3. The associative processing memory system of claim 2 further including a general control block coupled to said general register logic block and to said interface register logic block, comprising:

a state machine;

a multiple response resolver enable (MRREN) input signal which enables and disables said prioritizer and controls register access, said MRREN input signal coupled to said state machine;

a clock (CLK) input signal being used as a timing signal, said CLK input signal coupled to said state machine;

a chip select (CS) input signal coupled to said state machine;

a reset (RST) input signal coupled to said state machine;

a write enable (WE) input signal which controls a movement of a data pattern, said WE input signal coupled to said state machine;

an output enable (OE) input signal which enables said host bus, said OE input signal coupled to said state machine;

an access control code (AC) input signal which specifies a type of current register access, said AC input signal coupled to said state machine;

a register select (RS) code input signal which selects a register for access, said RS input signal coupled to said state machine; and a ready (RDY) output signal which is asserted when an output is ready to be sent or when an instruction is completed, said RDY coupled to said state machine.

4. The associative processing memory system of claim 1 wherein at least one of said plurality of response registers has each bit assigned to each CAM word in said CAM array, said prioritizer independently prioritizes at least one of said plurality of response registers automatically, and at least one of said plurality of response registers is independently used for any of the following operations:

said response register is either of a source and a destination of a logic operation including a multi-word operation wherein if said GPLB is used in said logic operation and if said response register is a destination, the contents of said response register are modified by an output of said GPLB;

said response register stores a result of a match operation;

the contents of said response register are prioritized by said prioritizer to select a CAM word in said CAM array for one of a read operation and a write operation;

said response register contains all zero bits so that no CAM words are selected for a read operation;

said response register is shifted up by one bit position;

said response register is shifted down by one bit position;

the most significant bit in said response register is cleared to read a next CAM word; and the most significant bit in said response register is cleared to write to a next CAM word.

5. The associative processing memory system of claim 1 wherein said plurality of response registers comprises (a) a first response register having a first input and a first output, and (b) a second response register having a second input and a second output, and said associative processing memory system further comprises:

a second content addressable memory (CAM) array having a second plurality of CAM words;

wherein said first input is coupled to said second output, and said second input is coupled to said first output.

6. The associative processing memory system of claim 5 wherein said plurality of response registers further comprises a third response register, and if one of said second response register and said third response register is selected, then said one of said second response register and said third response register is used to store a result of a match operation and is either of a source and a destination of a logic operation; and if said GPLB is used in said logic operation, and if one of said second response register and said third response register is a destination, then the contents of said one of said second response register and said third response register is modified by an output of said GPLB.

7. The associative processing memory system of claim 6 wherein the contents of said match storage circuit are used to select CAM words in said CAM array for access, wherein the contents of said match storage circuit are written to any of the group of registers consisting of said first response register, said second response register and said third response register, and wherein said match storage circuit includes a MATCH output wherein if a match is found, said MATCH output is asserted.

8. The associative processing memory system of claim 4 wherein said prioritizer is a priority encoder and if at least one response register prioritized by said prioritizer is non-zero, said prioritizer has one bit set corresponding to the most significant bit set in said at least one response register prioritized by said prioritizer, if at least one response register prioritized by said prioritizer contains all zero bits, then said prioritizer is set to all zeros, and no CAM word is selected for a read operation, and if the most significant bit set in said at least one response register prioritized by said prioritizer is cleared, said prioritizer selects a next CAM word for access, and said next CAM word corresponds to the second most significant bit set in a second response register before the most significant bit set in said at least one response register prioritized by said prioritizer is cleared.

9. The associative processing memory system of claim 8 wherein said prioritizer includes a some-response (SR) output signal, a multiple-response (MR) output signal and a multiple response resolver enable (MRREN) input signal wherein if said at least one response register prioritized by said prioritizer contains at least one bit set, indicating that at least one match is found, then said SR output signal is asserted, if said at least one response register prioritized by said prioritizer contains at least two bits set, indicating that at least two matches are found, then said MR output signal is asserted, if said MRREN input signal is deasserted, then said prioritizer is disabled, setting said prioritizer to all zeros, and said MRREN input signal has no effect on either of SR output signal and MR output signal.

10. The associative processing memory system of claim 6 wherein said GPLB includes various general purpose logic components to process data selected from the group consisting of said first response register, said second response register and said third response register, wherein said GPLB performs one of a plurality of different Boolean operations on said data, wherein an output of said GPLB is stored back to one of said first response register, said second response register and said third response register, and wherein an output of said GPLB is used to select at least one CAM word in said CAM array during a write operation.

11. The associative processing memory system of claim 1 wherein said reference value unit is used to provide all ones to said select vector so that every CAM word is selected for a write operation.

12. The associative processing memory system of claim 1 wherein a plurality of CAM systems are cascaded to increase the number of CAM words wherein said cascaded CAM systems provide a circuit for accessing either of a single CAM system and multiple CAM system wherein by controlling some-response (SR) output signals and multiple response resolver enable (MRREN) input signals of prioritizers in said cascaded CAM systems, one of said cascaded CAM system is enabled for access while other CAM systems are disabled.

13. The associative processing memory system of claim 1 wherein if a data pattern to be stored in said CAM array is longer than a length of a CAM word of said CAM array, then said data pattern is stored in multiple adjacent CAM words that are linked to form a multi-word storage unit.

14. The associative processing memory system of claim 13 wherein when said data pattern is longer than the length of the CAM word, and at least one response register is a multi-word response register, a multi-word match operation is performed by logically ANDing a current match result of each CAM word with a previous match result of a CAM word located above the current CAM word and by storing a result of each logical AND operation in said multi-word response register.

15. The associative processing memory system of claim 2 wherein said select vector is used for any of the following:

said select vector is used to select at least one CAM word in said CAM array for a write operation wherein the contents of either of said data-in register and a host bus which is coupled to said CAM array are stored into said CAM word selected;

said select vector is used to select one CAM word in said CAM array for a read operation wherein contents of said CAM word selected are transmitted to either of said data-out register and said host bus;

said select vector is a source for a write operation to any of said plurality of response registers; and the contents of said select vector are written to a whole column of said CAM array.

16. The associative processing memory system of claim 2 having two types of match operations including a Bit Match operation and a Multiple Valued Variable (MVV) Match operation wherein during a Bit Match operation, a data pattern qualified by a mask pattern is compared to the contents of said CAM array on a bit-by-bit basis; and during a MVV Match operation, MVVs are formed by grouping at least two CAM bits in each CAM word, and said MVVs are compared with MVVs formed from the contents of the data-in register and the mask register.

17. The associative processing memory system of claim 16 wherein said mask pattern comprises one pattern selected from the group consisting of the contents of said mask register, an internally generated fill pattern, an internally generated mark pattern and a logically ANDed product of an internally generated mask pattern and the contents of said mask register wherein said fill pattern comprises a pattern selected from the group consisting of (1) at least one zero in low order bit positions followed by all ones, (2) at least a one in low order bit positions followed by all zeros, (3) all zeros and (4) all ones; and said mark pattern includes either of a single one embedded in a word of zeros and a single zero embedded in a word of ones.

18. The associative processing memory system of claim 2 wherein a host bus which is coupled to said CAM array contains data selected from the group consisting of an input data pattern, an output data pattern, a mask pattern and an instruction, and wherein said host bus receives an output data pattern from either of said data-out register and said CAM array.

19. The associative processing memory system of claim 2 wherein said interface register logic block provides two-way communications between a host bus which is coupled to said CAM array and a group including said data-in register, said mask register, said data-out register, said command register and said control and status register so that not only data is written to and read from a register but also the contents of each register are validated by host software, and said interface register logic block provides one-way communications from said host bus to said data-source logic unit and from said CAM array to said host bus, wherein said control and status register includes status information regarding whether a match has occurred after a match operation and if a match is found, regarding an identification number of a CAM array in a cascaded CAM system chain where said match is found and a location of a particular CAM word found in said CAM array.

20. An associative processing memory system for concurrent data searching and concurrent data processing comprising:

a content addressable memory (CAM) array having a plurality of CAM words;

a general register logic block which generates a select vector, said general register logic block coupled to said CAM array comprising:

a multiplexer which selects one of a plurality of input devices and passes an output, representing said select vector, of one of said plurality of input devices, said multiplexer coupled to said CAM array, at least one response register which stores search results and is one of a source and a destination of a logic operation, said at least one response register coupled to said CAM array, and said plurality of input devices comprising:

a match storage circuit which stores search results from said CAM array, said match storage circuit coupled to said multiplexer, a prioritizer which prioritizes said at least one response register, said prioritizer coupled to said multiplexer and to said at least one response register, a general purpose logic block which performs a Boolean operation on the contents of said at least one response register, said general purpose logic block coupled to said multiplexer, and a reference value unit which supplies reference values to said multiplexer, said reference value unit coupled to said multiplexer; and an interface register logic block coupled to said CAM array, said interface register logic block comprising:

a first register which stores an input data pattern, said input data pattern being stored for either of a write operation and a search operation, a second register which stores a mask pattern, a third register which stores an output data pattern, said third register coupled to said CAM array, a fourth register which stores an instruction, a fifth register which stores control and status information, a first logic unit which selects a data pattern from the group of sources consisting of said first register, and a predetermined data pattern and transmits said selected data pattern to said CAM array, wherein said first logic unit coupled to said first register and to said CAM array, and a second logic unit which selects a mask pattern from the group of sources consisting of said second register and an internally generated mask pattern, and which transmits said selected mask pattern to said CAM array, said second logic unit coupled to said mask register and to said CAM array.

* * * * *